United States Patent [19]

Carol, Jr.

[11] 4,160,900
[45] Jul. 10, 1979

[54] MILEAGE SWITCH AND LATCH MEANS

[75] Inventor: John A. Carol, Jr., Flint, Mich.

[73] Assignee: General Motors Corporation, Detroit, Mich.

[21] Appl. No.: 868,608

[22] Filed: Jan. 11, 1978

[51] Int. Cl.² .................. G01C 22/00; G06M 3/00
[52] U.S. Cl. .................. 235/132 E; 235/95 R; 335/207
[58] Field of Search ........... 235/1 D, 1 C, 95 R, 235/96, 97, 132 E; 116/114 W; 335/205, 207, 236

[56] References Cited

U.S. PATENT DOCUMENTS

| | | | |
|---|---|---|---|
| 2,601,838 | 7/1952 | Boates | 116/114 W |
| 3,009,033 | 11/1961 | Werts | 335/207 |
| 3,164,696 | 1/1965 | Pusch | 335/207 |
| 3,529,768 | 9/1970 | Nakanishi et al. | 235/132 E |
| 3,651,438 | 3/1972 | Hayashi et al. | 335/207 |
| 3,685,041 | 8/1972 | Kondur, Jr. | 335/207 |
| 3,711,016 | 1/1973 | Milvich | 235/132 E |

Primary Examiner—L. T. Hix
Assistant Examiner—Benjamin R. Fuller
Attorney, Agent, or Firm—John P. Moran

[57] ABSTRACT

The drawings illustrate a switch and latch arrangement responsive to vehicular odometer movement and including means formed at a predetermined location on one of the odometer number wheels, indicative of a predetermined cumulative vehicle travel, for pivoting suitable magnetic shunt means from a first position out of the path of lines of flux extending from a permanent magnet to a magnetically actuated reed switch to a second position in the path of the lines of flux, in order to selectively control an external device electrically connected to the reed switch.

3 Claims, 4 Drawing Figures

MILEAGE SWITCH AND LATCH MEANS

The invention relates generally to mileage switch and latch means and, more particularly, to magnetically actuated switch and latch means responsive to odometer movement.

For some vehicular applications it is desirable to have particular vehicle devices controlled through magnetic actuating and shunting means upon attainment of a predetermined cumulative vehicle travel.

Accordingly, an object of the invention is to provide an improved mileage switch and latch arrangement wherein cam or other means are formed at a predetermined location on one of the wheels of a conventional vehicle odometer, indicative of a predetermined cumulative vehicle travel, for pivoting a high permeability pivotally mounted member from a position out of the path to a position in the path of lines of flux extending from a permanent magnet to a magnetically actuated reed switch to thereby deactuate the latter upon attainment of the cumulative travel.

A more specific object of the invention is to provide, in a vehicular odometer assembly, for use with a device to be controlled upon attainment by the vehicle of a predetermined cumulative travel, a switch and latch arrangement including magnetically actuated switch means operatively connected to the device to be controlled, a permanent magnet positioned adjacent the switch means so as to direct its lines of flux through a predetermined space toward the switch means for magnetically actuating same, magnetic shunt means, such as an L-shaped lever including a high permeability shutter member, pivotally mounted adjacent a predetermined one of the number wheels and positioned so as to be selectively pivotable into the space between the permanent magnet and the switch means to provide a shunted magnetic path for the lines of flux away from the magnetically actuated switch means, and actuating means, such as a cam member or a second permanent magnet, mounted at a predetermined location on the predetermined one of the number wheels indicative of the predetermined cumulative vehicle travel for selectively pivoting the lever and, hence, the shutter member from a first position either out of or in the path of the lines of flux to, respectively, a second position either in or out of the path of the lines of flux once the cam member or second magnet is rotated by the associated number wheel into contact with the lever.

These and other objects and advantages will become more apparent when reference is made to the following description and accompanying drawings, wherein.

Figure 1:
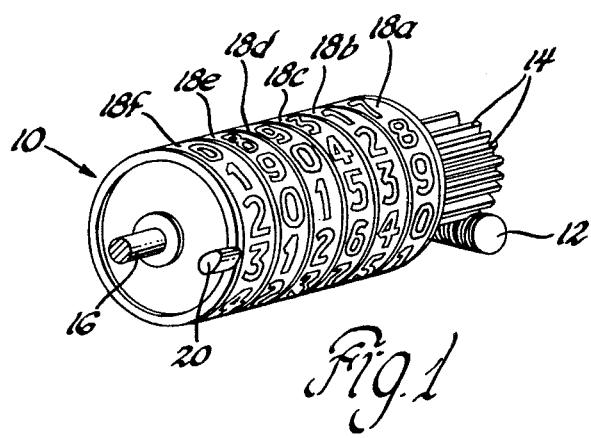
FIG. 1 is a perspective view of a conventional vehicular odometer arrangement modified as required to accommodate the invention.

Referring now to the drawings in greater detail, FIG. 1 illustrates a conventional odometer 10 with the housing and certain parts removed. The odometer is typically driven through a worm gear 12 mounted on a vehicular speedometer shaft (not shown), and a drive gear 14 mounted on a shaft 16. A plurality of wheels 18a, 18b, 18c, 18d, 18e and 18f are mounted on the shaft 16, each having equidistant numerals from 0 to 9 formed on the outer surface thereof. When the wheel 18a, which is driven by the drive gear 14 and customarily indicates 1/10th units, has completed a complete revolution, suitable means, such as a small driving catch (not shown) rotates the adjacent units wheel 18b one place. This process is continued through the 10 units wheel 18c, 100 units wheel 18d, and 1000 units wheel 18e, until the highest-order number wheel 18f, indicative of 10,000 units, is advanced one place upon completion of a complete turn by the adjacent 1000 units wheel 18e.

A cam or other projection 20 is formed at a predetermined location on one of the wheels, for example, the highest-order number wheel 18f, at a point intermediate the numerals 2 and 3 thereof, the numeral 3 being representative of 30,000 miles of cumulative vehicle travel. An L-shaped lever 22 (FIG. 2), including a horizontally oriented leg 24 and a vertically oriented leg 26, is pivotally mounted at the juncture of the legs by suitable press-fitted pivot means, represented at 27, such that the leg 24 is positioned and retained adjacent the outer peripheral surface of the wheel 18f in the path of the cam 20. Suitable magnetic shunt means, such as a shutter member 28 composed of high permeability material, is mounted on the distal end of the leg 26. By virtue of being vertically oriented, there is no gravitational effect on the shutter member 28 which would tend to cause it to pivot prior to a mechanically-actuated rotation thereof, as will be explained.

As seen in the end view, the shutter member 28 is adapted to swing an arc through a path which is disposed in a space 30 (FIG. 3) between a permanent magnet 32 and magnetically actuated switch means, such as a reed switch 34. Lines 36 leading from the switch 34 are connected to some device 38 which is to be controlled, such as a computer, for example, upon attainment of some predetermined cumulative travel, such as the above mentioned 30,000 miles, for some particular purpose.

In operation, the permanent magnet 32 directs its lines of flux through the space 30 toward the switch 34 for magnetically actuating same to normally complete the circuit to the device 38.

Once the predetermined cumulative travel is attained, i.e., once the wheel 18f is suddenly rotated by the adjacent wheel 18e from its position indicative of 20,000 miles to a position indicative of 30,000 miles, the cam 20 will contact the leg 24 of the lever 22 and pivot it so as to cause the shutter member 28 to traverse into the space 30 directly between the permanent magnet 32 and the switch 34, providing a shunted magnetic path for the lines of flux away from the magnetically actuated switch 34, and thereby breaking the circuit to the device 38. The high permeability shutter member 28 is latched or retained in its new position by the lines of flux from the permanent magnet 32, preventing further influence of the magnet 32 on the reed switch 34.

It should be apparent that the lever 22 and the associated shutter member 28 could be located so as to be pivoted out of the space between the magnet 32 and the switch 34, rather than into such space, by the cam 20 upon attainment of the predetermined cumulative travel.

Figure 3:
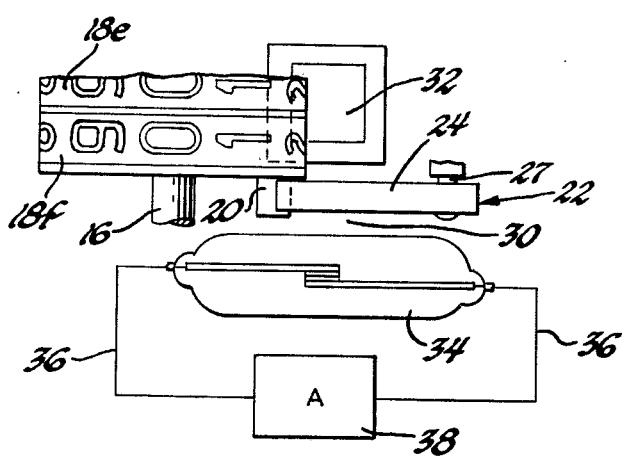
FIG. 3 is a side elevational view of the odometer arrangement embodying the invention.
Figure 4:
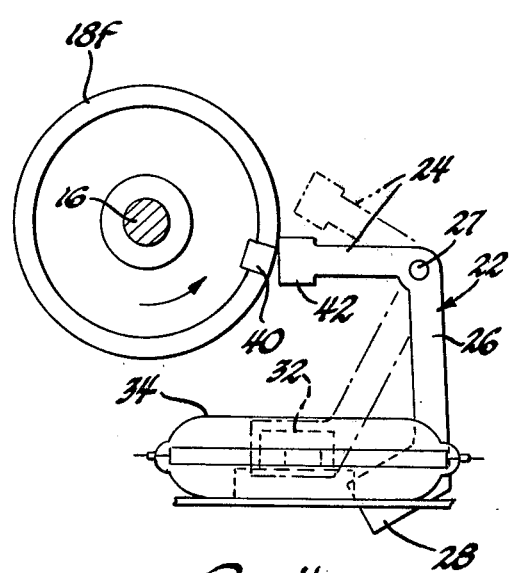
FIG. 4 is a fragmentary end view of an odometer arrangement illustrating an alternate embodiment of the invention.

In FIG. 4, an alternate arrangement is illustrated as including a permanent magnet 40 mounted on the highest-order number wheel 18f, in lieu of the cam 20. A suitable metal flange 42 is formed on the distal end of the leg 24 of the lever 22, adapted to being attracted by the magnet 40, upon attainment of the above described predetermined cumulative travel, and thus pivoted about the pivot means 27. The operation thereafter is as described above relative to FIGS. 1-3.

Figure 2:
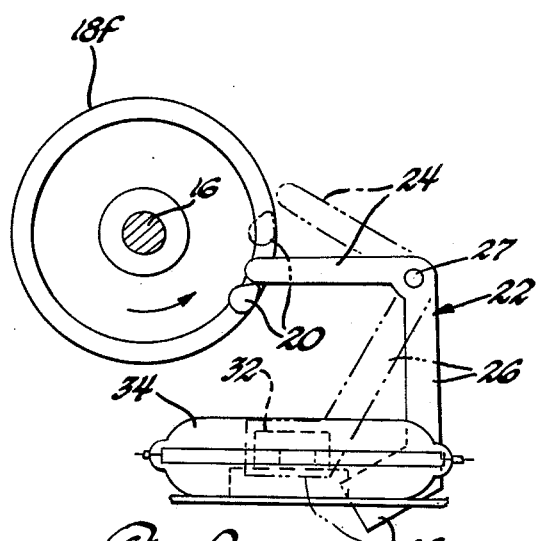
FIG. 2 is a plan view of an odometer arrangement embodying the invention.

It's apparent that, for particular vehicular applications, a suitable cam 20 or magnet 40 could be mounted on a wheel other than the highest-order number wheel 18f by being formed on the outer periphery thereof, rather than on a side surface as shown in FIGS. 1-3 for the end wheel 18f.

While but two embodiments of the invention have been shown and described, other modifications thereof are possible.

The embodiments of the invention in which an exclusive property or privilege is claimed are defined as follows:

1. In a vehicular odometer having an array of cylindrical coaxial number wheels interconnected to rotate stepwise in digital counting action and in sequence to indicate numerically the cumulative vehicle travel, for use with a device to be controlled upon attainment by the vehicle of a predetermined cumulative travel, the improvement comprising magnetically actuated switch means operatively connected to the device to be controlled for selectively controlling same, a permanent magnet positioned adjacent the magnetically actuated switch means so as to direct its lines of flux through a predetermined space toward the magnetically actuated switch means for magnetically actuating the switch means, magnetic shunt means pivotally mounted adjacent a predetermined one of the number wheels and positioned so as to be selectively pivotable into the space between the permanent magnet and the magnetically actuated switch means to provide a shunted magnetic path for the lines of flux away from the magnetically actuated switch means, and actuating means formed at a predetermined location on the predetermined one of the number wheels indicative of the predetermined cumulative vehicle travel for selectively pivoting the magnetic shunt means from a first position out of the path of the lines of flux to a second position in the path of the lines of flux upon movement of the actuating means by the predetermined one of the number wheels into an operative relationship with the magnetic shunt means.

2. In a vehicular odometer having an array of cylindrical coaxial number wheels interconnected to rotate stepwise in digital counting action and in sequence to indicate numerically the cumulative vehicle travel, for use with a device to be controlled upon attainment by the vehicle of a predetermined cumulative travel, the improvement comprising magnetically actuated switch means operatively connected to the device to be controlled for selectively controlling same, a permanent magnet positioned adjacent the magnetically actuated switch means so as to direct its lines of flux through a predetermined space toward the magnetically actuated switch means for magnetically actuating the switch means, an L-shaped lever pivotally mounted adjacent a predetermined one of the number wheels, a high permeability shutter member formed on one distal end of the lever and positioned so as to be selectively pivotable into the space between the permanent magnet and the magnetically actuated switch means to thereby become latched in place and provide a shunted magnetic path for the lines of flux away from the magnetically actuated switch means, and a cam member formed at a predetermined location on the predetermined one of the number wheels indicative of the predetermined cumulative vehicle travel for selectively pivoting the lever and thereby pivoting the shutter member from a first position out of the path of the lines of flux to a second position in the path of the lines of flux upon movement of the cam member by the predetermined one of the number wheels into contact with the other distal end of the L-shaped lever.

3. In a vehicular odometer having an array of cylindrical coaxial number wheels interconnected to rotate stepwise in digital counting action and in sequence to indicate numerically the cumulative vehicle travel, for use with a device to be controlled upon attainment by the vehicle of a predetermined cumulative travel, the improvement comprising magnetically actuated switch means operatively connected to the device to be controlled for selectively controlling same, a first permanent magnet positioned adjacent the magnetically actuated switch means so as to direct its lines of flux through a predetermined space toward the magnetically actuated switch means for magnetically actuating the switch means, an L-shaped lever pivotally mounted adjacent a predetermined one of the number wheels, a high permeability shutter member formed on one distal end of the lever and positioned so as to be selectively pivotable into the space between the first permanent magnet and the magnetically actuated switch means to thereby become latched in place and provide a shunted magnetic path for the lines of flux away from the magnetically actuated switch means, and a second permanent magnet mounted at a predetermined location on the predetermined one of the number wheels indicative of the predetermined cumulative vehicle travel for selectively pivoting the lever and thereby pivoting the shutter member from a first position out of the path of the lines of flux to a second position in the path of the lines of flux upon movement of the second permanent magnet by the predetermined one of the number wheels into contact with the other distal end of the L-shaped lever.

* * * * *